(12) United States Patent
Bailey et al.

(10) Patent No.: US 10,021,857 B2
(45) Date of Patent: Jul. 17, 2018

(54) EAR TAG FOR LIVESTOCK AND METHOD FOR PRODUCING AN EAR TAG FOR LIVESTOCK

(71) Applicant: DATAMARS SA, Bedano (CH)

(72) Inventors: Robert Douglas Bailey, Temple, TX (US); Damien Pachoud, Pregassona (CH)

(73) Assignee: DATAMARS SA, Bedano (CH)

( * ) Notice: Subject to any disclaimer, the term of this patent is extended or adjusted under 35 U.S.C. 154(b) by 1 day.

(21) Appl. No.: 15/204,180

(22) Filed: Jul. 7, 2016

(65) Prior Publication Data

US 2018/0007863 A1 Jan. 11, 2018

(51) Int. Cl.
*A01K 11/00* (2006.01)
*G06K 19/07* (2006.01)
*G06K 19/077* (2006.01)
*B32B 37/14* (2006.01)

(52) U.S. Cl.
CPC ............ *A01K 11/004* (2013.01); *B32B 37/14* (2013.01); *G06K 19/0723* (2013.01); *G06K 19/07722* (2013.01); *G06K 19/07786* (2013.01); *B32B 2519/02* (2013.01)

(58) Field of Classification Search
CPC .. A01K 11/004; H05K 1/0271; H05K 5/0252; H05K 5/066; B32B 37/14; B32B 2519/02; G06K 19/07722; G06K 19/07786; G06K 19/0723
See application file for complete search history.

(56) References Cited

U.S. PATENT DOCUMENTS

| | | | | |
|---|---|---|---|---|
| 4,718,697 | A | * | 1/1988 | Berardus van Amelsfort ............ A01K 11/004 206/309 |
| 5,321,240 | A | * | 6/1994 | Takahira .......... G06K 19/07728 235/380 |
| 5,461,807 | A | * | 10/1995 | Johnson ............... A01K 11/004 40/300 |
| 2001/0040186 | A1 | * | 11/2001 | Okada .............. G06K 19/07728 235/492 |
| 2011/0203144 | A1 | * | 8/2011 | Junek ................... A01K 11/001 40/300 |
| 2012/0285056 | A1 | * | 11/2012 | Corrales, Jr. ........ A01K 11/004 40/301 |
| 2013/0175347 | A1 | * | 7/2013 | Decaluwe ............ A01K 11/004 235/492 |
| 2013/0207848 | A1 | * | 8/2013 | Epp ........................ B32B 15/04 343/700 MS |
| 2016/0192622 | A1 | * | 7/2016 | Yeum ............... G06K 19/07758 40/301 |

* cited by examiner

*Primary Examiner* — Charles A Fox
*Assistant Examiner* — Christopher E Veraa
(74) *Attorney, Agent, or Firm* — Duane Morris LLP; J. Rodman Steele, Jr.; Gregory M. Lefkowitz

(57) ABSTRACT

It describes an ear tag for livestock including: a plastic substrate including means to apply the ear tag to an ear of an animal; an UHF inlay coupled to a flexible flat portion of the plastic substrate, the UHF inlay including a substrate, an antenna on the substrate and a microchip connected to the antenna. The ear tag includes a plastic film; a predetermined portion of the plastic film is laminated on the plastic substrate and forms a closed pocket; the UHF inlay is enclosed in the pocket and is at least in part movable independently from the plastic substrate and the plastic film in the pocket.

15 Claims, 5 Drawing Sheets

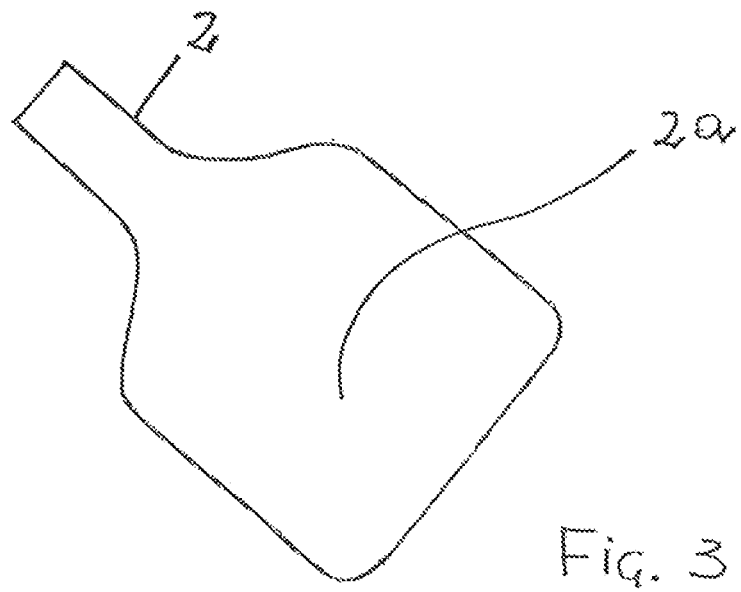
Fig. 3
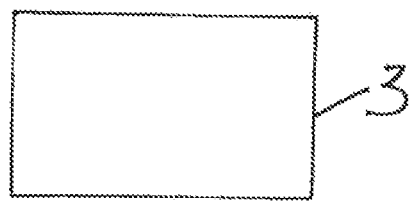
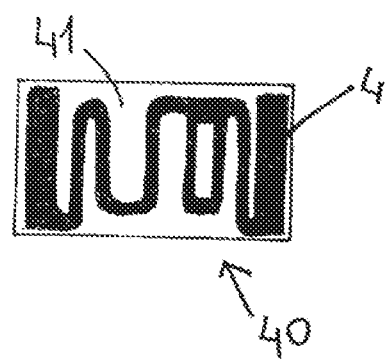

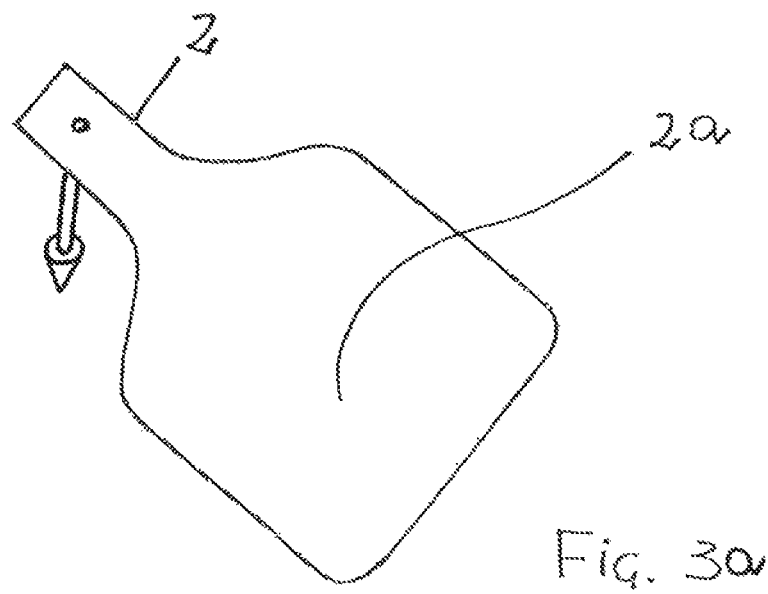
Fig. 3a
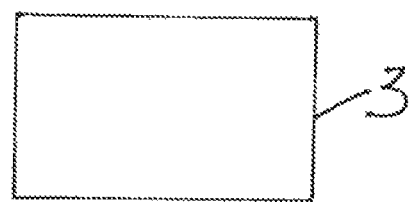
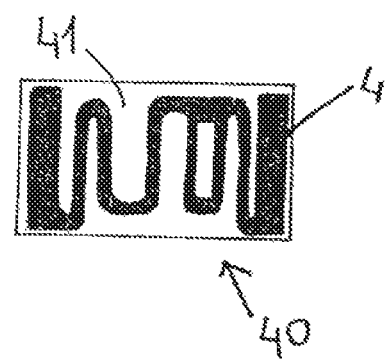

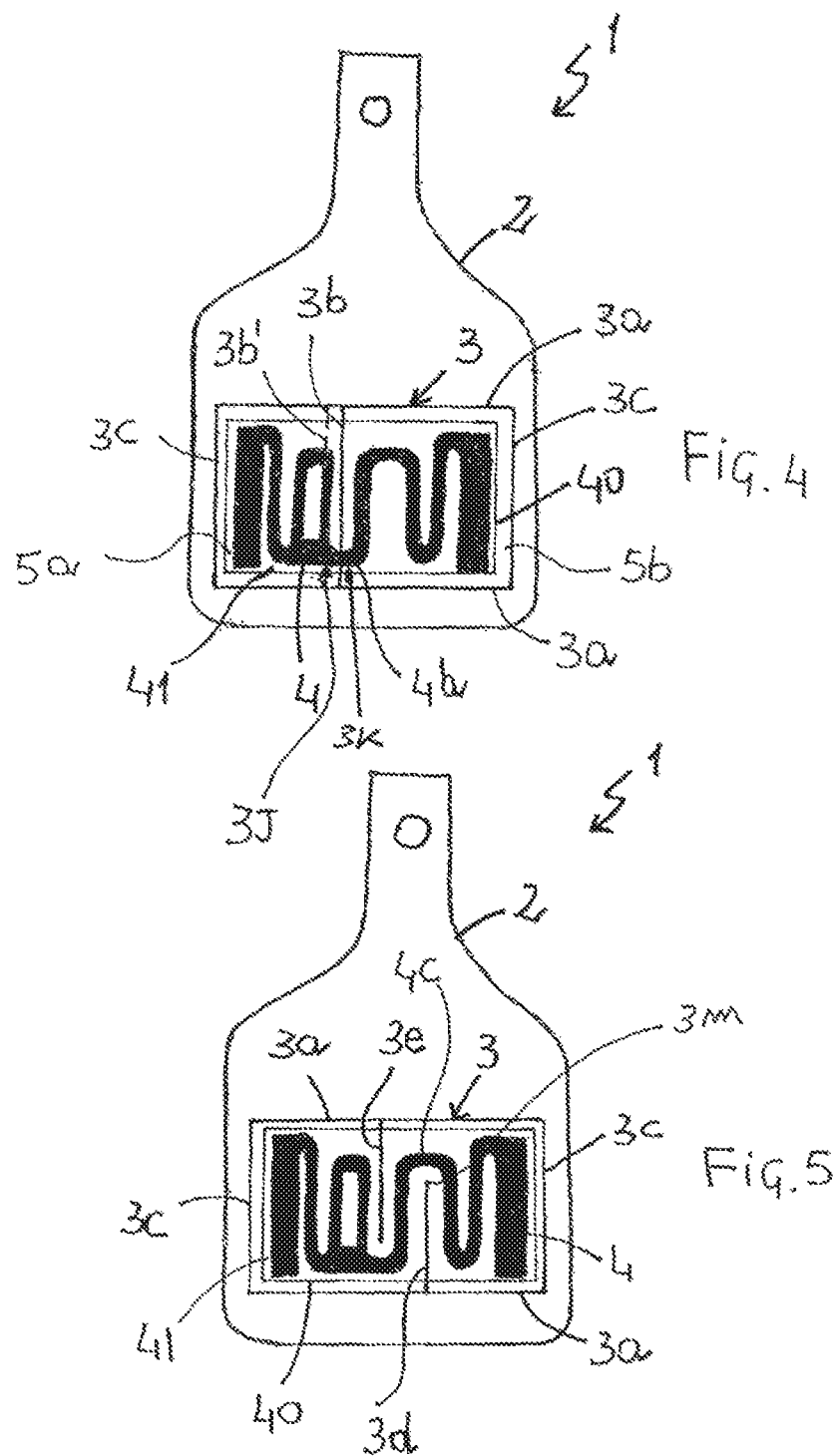

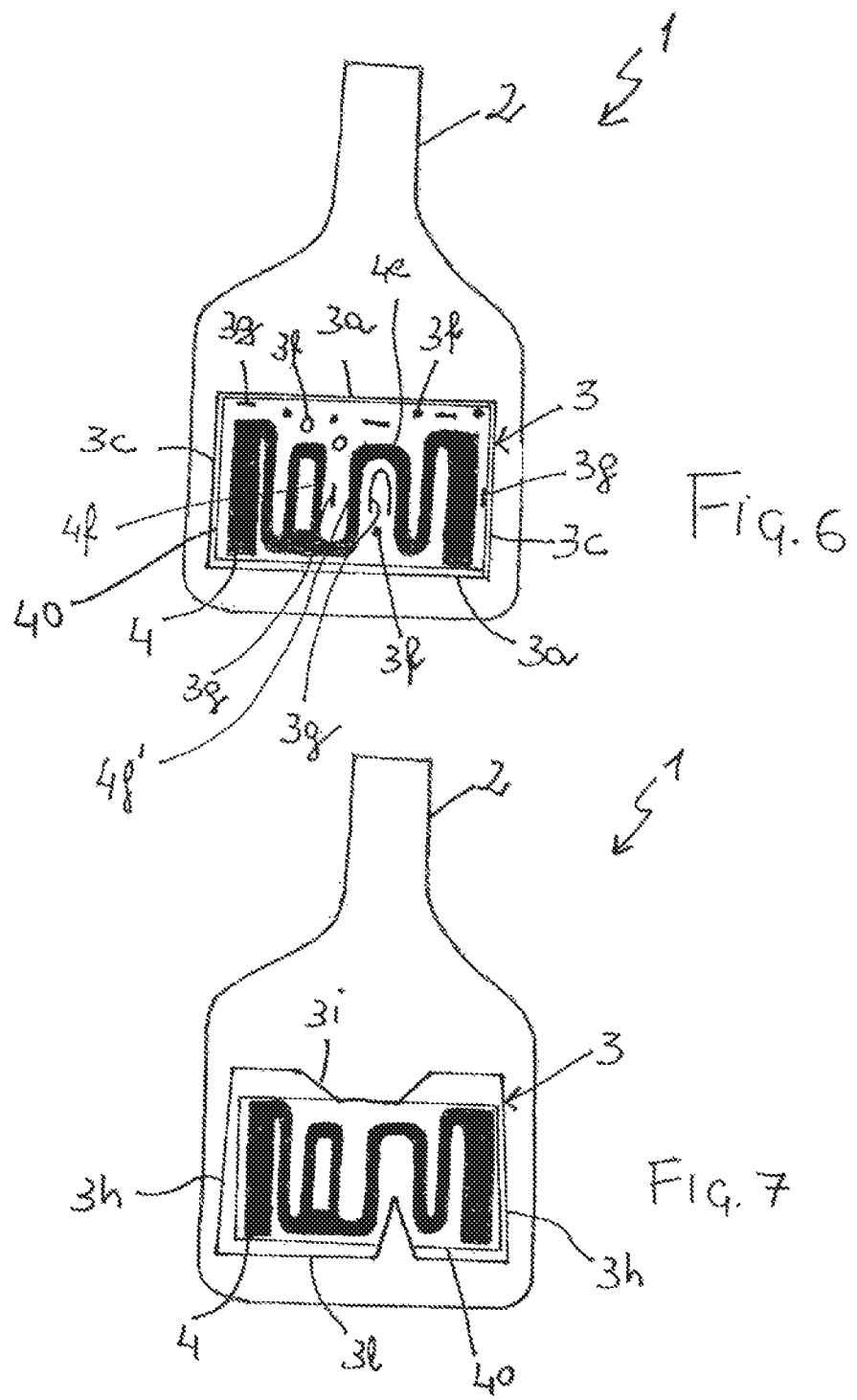

EAR TAG FOR LIVESTOCK AND METHOD FOR PRODUCING AN EAR TAG FOR LIVESTOCK

FIELD OF APPLICATION

The present invention relates to an ear tag for livestock including a plastic substrate, comprising means to apply the ear tag to an ear of an animal, and an UHF inlay assembled to a flexible flat portion of the plastic substrate to store and communicate information of the animal.

The present invention also relates to a method of manufacturing an ear tag for livestock including a plastic substrate and an UHF inlay antenna with a microchip, wherein the UHF inlay assembled to a flexible flat portion of the plastic substrate to store and communicate information of the animal.

PRIOR ART

As known, an ear tag is a plastic object used for identification of domestic livestock and other animals.

The ear tag may have different shapes. For instance, it may be flag-shaped and may include a male and a female part or other coupling means adapted to join together through the ear of the animal, and a flat plastic surface on which identification details are written or printed in large, legible number or letters. The ear tag may have several different form, for instance a moulded plastic strip, folded over the edge of the ear and joined through it as a clip.

The ear tag can be done using a one piece tag (one flag which includes the male part allowing the tag to punch and remain in the animal ear) or alternatively using a two pieces tag, where male and female are two separate parts.

In all the embodiments of the ear tag for livestock application, it is important that a flat plastic surface is provided to allow easily reading the information.

It is also known that the ear tag may include an RFID chip, which carries an electronic version of the same identification number or letter, or additional information concerning the animal and conforming to international standards, for instance ISO 11784 and ISO 11785 working at 134.2 kHz or ISO/IEC 18000-6C operating in the UHF spectrum.

The RFID chip includes a planar antenna and a planar microchip which are embedded in the plastic material of the ear tag, for instance in the flat plastic surface portion of the ear tag, for mechanical protection and antifraud.

Several methods for assembling the RFID chip to the flat plastic surface of the ear tag are known. For instance, according to one of the known method, the UHF antenna and the microchip are glued, drawn, etched or soldered on a separate film, typically made of PET material, which is subsequently fixedly joined, by gluing or welding, to the flat plastic surface portion of the ear tag.

Although commonly used, the ear tag, manufactured as above indicated suffers for the problem that the UHF antenna and the microchip are subject to mechanical stresses, due to bending of the flat plastic surface, especially when the tag is in use on the ear of the animal, which may determine ruptures in the electrical connections among the microchip and the UHF antenna or breakage of the antenna, ending in the impossibility to access the information stored in the microchip or to communicate with it.

Another known method provides to embed the UHF antenna and microchip in the ear tag, for instance using over-moulding techniques wherein the UHF antenna and microchip are placed in a moulding tool and plastic material is injected in the tool all over the UHF antenna and microchip to shape the flat plastic support portion and the remaining portions of the ear tag.

However, also after over moulding, the UHF antenna and microchip of the resulting ear tag are subject to the same stress mentioned above since, once the flat plastic surface portion of the tag is bent to a certain degree, also the UHF antenna and microchip are bent to the same degree. In this case, a special UHF inlay mounted on a more robust substrate, typically made of Kapton, are used to make the RFID part more robust. Moreover, these methods are expensive since they need a specific moulding tool and automation to load the UHF inlay into the mould; for instance, the moulding tool and its automation must be adapted to electronic components (UHF antenna and microchip) to be embedded inside the ear tag, for example to the size or forms of the electronic components.

The problem at the base of the present invention is to provide an ear tag including an UHF antenna and a microchip which is adapted to prevent or reduce stress on it, for instance ruptures of electronic connections or damages to the antenna, at the same time simplifying the structure of the ear tag and the method for manufacturing the ear tag, overcoming all the limitations that currently affects the ear tags of the prior art.

SUMMARY OF THE INVENTION

The idea at the base of the present invention is to provide an ear tag including a plastic substrate, more particularly a thin, flat and flexible support, for instance in the form of a flag, and a UHF antenna and a corresponding microchip, wherein the ear tag includes a pocket in correspondence of the plastic support, the pocket enclosing the UHF antenna and the microchip or a portion thereof in a space which is not subject to the same solicitations involving the plastic support, for instance when the plastic support is bent.

The ear tag according to the present invention may be in the form of a one piece tag, i.e. only one flag including a male part adapted to punch the tag to the animal ear and remain in it. The ear tag may be also a two pieces tag, including a male and a separate female, the male and female being provided with means adapted to be coupled for fixing the male to the female through the ear of the animal, from opposite side thereof.

Advantageously, according to this idea of solution, when the plastic support is bent, the UHF antenna and the microchip are free to move inside the pocket (the space inside it), and not forced to follow the bending of the plastic support, or at least not fixedly forced to follow the same bending of the plastic support, avoiding the UHF inlay to be stretched and consequently damaged. The expression "UHF inlay" hereafter relates to a substrate, for instance a PET layer, on which a UHF antenna is arranged and then connected to a microchip. Different techniques may be used to arrange the antenna on the substrate, for instance etching, printing, lamination, etc. . . . different techniques may also be used to connect the microchip to the UHF antenna, for instance by flip-chip or wire-bonding technologies. The UHF inlay is ultimately the functional RFID component of the ear tag. Preferably, the pocket is formed by laminating a border or predetermined portion(s) of a flexible plastic film on the plastic support, thus delimiting at least one pocket, between the portion(s) of the plastic film which is not laminated and the plastic support. The UHF antenna or portions thereof are free from fixed structural connections with the ear tag in the at least one pocket formed between the plastic film and the plastic support or substrate. The term plastic support and plastic substrate are used as synonyms in the following description.

Lamination is preferably made by thermo-compression technology, which means by applying temperature and pressure for a predetermined time.

Preferably, in the predetermined portion to be laminated, the plastic film is thicker. In other words, the plastic film includes thicker tines delimiting the predetermined portions, wherein the thicker lines are laminated, preferably thermo-compressed, onto the flat and flexible portion of the plastic substrate.

According to the idea of solution given above, the technical problem is solved by an ear tag for livestock including:
 a plastic substrate comprising means to apply the ear tag to an ear of an animal;
 an UHF inlay arranged on a flexible flat portion of the plastic substrate; and
 characterized by the fact that;
 the ear tag includes a plastic film;
 a predetermined portion of the plastic film is laminated on the plastic substrate and forms a closed and sealed pocket;
 the UHF inlay is enclosed in the pocket and is at least in part movable independently from the plastic substrate and the plastic film in the pocket.

The means to apply the ear tag may be included in a male part which is the single component of a one piece ear tag or may be included in a male part and/or a female part of a two pieces ear tag.

The plastic substrate flat at rest, flexible and thin, for instance from 1 to 5 mm.

The UHF inlay is flat at rest, flexible, and thinner than the plastic substrate; preferably the UHF antenna is in aluminium, deposited on a PET substrate and connected using flip-chip technology with the microchip.

Also the plastic film is flat at rest, flexible and thinner than the plastic substrate.

As explained in the following description, the term pocket is used to indicate one single space delimited by laminating the plastic film onto the plastic support along a closed path as well as a plurality of spaces delimited by the plastic film onto the plastic support by laminating the plastic film onto the plastic support along more than one closed path; the single path or the plurality of paths corresponds the predetermined portions of the plastic film to be laminated.

In an aspect of the invention, the UHF inlay may be entirely free inside the one single pocket. In another aspect, different portions of the UHF inlay may be free inside corresponding pocket and one or more portions may be fixed between the plastic film and the plastic substrate in correspondence of predetermined portions of lamination, for instance portions of laminations separating one pocket from another pocket of a plurality of pockets.

In an aspect of the invention, the predetermined portion includes peripheral edges of the plastic film. If just the peripheral edges of the plastic film are laminated, the ear tag includes one single pocket and the UHF inlay may be entirely inside the pocket.

Preferably, the peripheral edges include two parallel edges, along a length of the UHF inlay, and two parallel edges, along a width of the UHF inlay, the two edges along the length being perpendicular to the two edges along the width. The pocket may have rectangular shape.

Preferably, the predetermined portion further includes at least one portion extending inside the peripheral edges of the plastic film. The extending portion may originate from a peripheral edge towards another edge, for instance towards a counter posed edge of a rectangular pocket, without touching the UHF antenna. Accordingly, also in this embodiment, the ear tag includes only one pocket.

In an embodiment, the portion inside the peripheral edges delimits two separate pockets.

For instance, the portion inside the peripheral edges delimiting the two separate pockets connects one edge of the peripheral edges to another edge of the peripheral edges, for instance counter posed edges of a rectangular pockets.

The portion inside the peripheral edges cross over at least a portion of the UHF antenna. Preferably, the portion inside the peripheral edges is arranged to reduce or minimize a size of the crossed portion of the UHF antenna.

In another embodiment, at least one portion inside the peripheral edges of the plastic film starts from an edge of the peripheral edges and ends at an inner part of the plastic film, wherein the at least one portion does not cross over the UHF antenna.

In still another embodiment, at least one portion inside the peripheral edges of the plastic film includes points or circles of lamination and/or lines of lamination, wherein the lines of lamination are curved or straight, and wherein the circles, points or lines do not cross over the UHF antenna and do not touch the peripheral edges.

In still another embodiment, the predetermined portions include a plurality of lines around the UHF antenna, wherein the plurality of lines are connected to form angles, including acute angles and obtuse angles.

In an aspect of the invention, the predetermined portions may include a plurality of lines around the UHF antenna, wherein the plurality of lines follow an external shape of the UHF antenna.

One or more features above cited in connection with one embodiment may be combined with other features of another embodiment.

For instance, the predetermined portion may include:
 the peripheral edges surrounding the UHF antenna, following or not following the shape of the antenna and
 one line starting from a peripheral edge and ending on another edge, passing through the inner portion of the plastic film from side to side and crossing over a portion of the UHF inlay or the UHF antenna and/or
 one or more lines starting from a peripheral edge and ending inside the plastic film without crossing over the UHF inlay or the UHF antenna;
 one or more points or circles or inner lines, not touching the peripheral edges.

At least one of the plastic substrate and the plastic film are preferably made in TPU (thermoplastic polyurethane) material to enhance adhesion when lamination. More preferably, both the plastic substrate and the plastic film are made in TPU material.

The plastic substrate is thicker than the plastic film and the thickness of the plastic film is preferably less than 150 micro meters.

The technical problem mentioned above is solved also by a method to form an ear tag for livestock including:
 providing a plastic substrate including means to apply the ear tag to an ear of an animal;
 applying an UHF inlay on a flexible flat portion of the plastic substrate;
 characterized by:
 laminating a plastic film on the flexible flat portion of the plastic substrate, wherein the plastic film is laminated at a predetermined portion to form a closed pocket enclosing the UHF inlay between the plastic film and the plastic substrate.

The step of lamination includes sealing by temperature and pressure the plastic substrate and the plastic film which are preferably in TPU material.

Further advantages and characteristics of the ear tag and the corresponding method of production the ear tag are described with reference to the annexed drawings, given just for exemplification and without limiting the scope of protection of the present application.

BRIEF DESCRIPTION OF THE DRAWINGS

FIG. 3 represents a UHF inlay, including a substrate, an antenna on the substrate and a microchip connected to the antenna, a plastic film and a plastic substrate of the ear tag, wherein the plastic substrate is the plastic substrate of a female according to FIG. 1.

FIG. 3a represents a UHF inlay, including a substrate, an antenna on the substrate and a microchip connected to the antenna, a plastic film and a plastic substrate of the ear tag, wherein the plastic substrate is the plastic substrate of a male.

FIG. 4 is an embodiment of the ear tag according to present invention.

FIG. 5 is another embodiment of the ear tag according to present invention.

FIG. 6 is further embodiment of the ear tag according to present invention.

FIG. 7 is still a further embodiment of the ear tag according to present invention.

DETAILED DESCRIPTION

Figure 1:
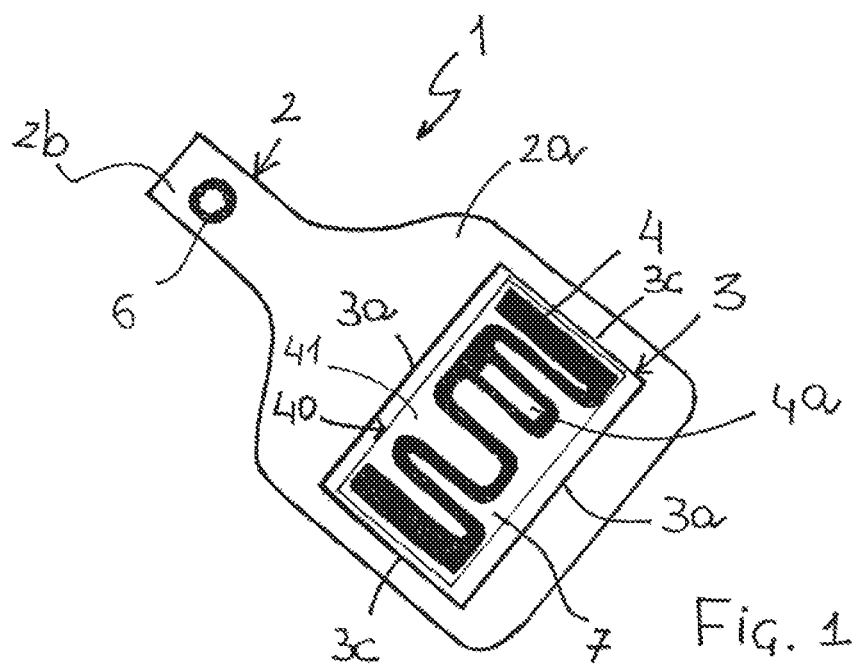
FIG. 1 is a top view of the ear tag according to the present invention.

With reference to the annexed drawing, it is schematically represented an ear tag 1 according to the present invention, and more particularly an ear tag 1 for livestock application including a plastic substrate 2 and an UHF inlay 40 coupled to the plastic substrate 2, the UHF inlay 40 including a substrate 41, an antenna 4 on the substrate 41 and a microchip connected to the antenna.

The plastic substrate 2 includes means 6 adapted to attach the tag 1 to the ear of an animal and a portion 2a, preferably flat and flexible, wherein identification details (not shown in FIG. 1) are written or printed in large, legible number or letters. The UHF inlay 40 is preferably coupled to the plastic substrate 2 in correspondence of the same flexible and flat portion 2a thereof, where the letters or number are printed; however, nothing prevents that the UHF inlay 40 is coupled in correspondence of another portion of the plastic substrate 2, preferably another flexible and flat portion, for instance adjacent to the portion 2a where the identification details are printed. The UHF inlay 40 is flat at rest, flexible, and thinner than the plastic substrate, preferably in aluminium, and incorporates a microchip for data storages and processing.

In the ear tag of FIG. 1, the means 6 are in a plastic strip 2b, long and narrow, which is narrower than the flexible and flat portion 2a to which the UHF inlay is coupled. However, nothing prevents that the ear tag 1 have different form; for instance it may be a moulded plastic strip, adapted to be folded on itself and over the edge of the ear, and joined through it as a clip; similarly, nothing prevents that ear tag have a flag-shaped form with means 6 differently positioned on the plastic substrate 2.

The plastic substrate is thin, for instance between 1 and 5 mm and its size is, for instance, from 3 cm to 10 cm long and from 2 cm to 8 cm wide, in the area or the flexible and flat portion 2a and, for instance, from 1 cm to 3 cm wide and from 2 cm to 8 cm long, in the area of the plastic strip 2b. Preferably, the plastic strip 2b and the flexible and flat portion 2a are connected by a curved portion and at least some of the corners of the plastic substrate are curved.

In case the ear tag is a two piece ear tag, coupling means (not represented) may be separate from said means 6 embedded in the plastic strip 2b, and adapted to be fixedly inserted in a hole of the means 6 from opposite side of the animal's ear, to hold the ear tag in position.

According to the present invention, the ear tag 1 comprises:
 a plastic film 3;
 a predetermined portion 3a-3l of the plastic film 3 is laminated on the plastic substrate 2 and forms at least one closed pocket 5;
 the UHF inlay 40 is enclosed in the pocket 5 and is at least in part movable independently from the plastic substrate 2 and from the plastic film 3 in the pocket 5.

The plastic film 3 of the ear tag represented in FIG. 1 is in the form of a rectangular having two opposite long edges 3a and two opposite short edges 3c. The UHF antenna 4 is flat and, for instance etched in the form of a sinusoidal antenna delimiting an area 4a, preferably ring shaped, wherein the microchip (not represented) is placed and connected to the antenna 4.

The size of the plastic film 3 may be, for instance, from 60% to 90% of the size of the flexible and flat portion 2a; however, nothing prevents that the ratio between the size of the flexible and flat portion 2a and the plastic film 3 is different, for instance depending on the size of the pocket to be delimited and the size of the antenna 4.

The size of the plastic film 3 is at least sufficient to cover all the UHF inlay 40. The plastic film is flat at rest, flexible and thinner than the plastic substrate, for instance 150 micro meter.

Always with reference to FIG. 1, the predetermined portion of the plastic film 3 which is laminated on the plastic substrate 2 corresponds to the edges 3a, 3c of the plastic film; the inner portion 7 of the plastic film 3 is not fixed, onto the flexible and flat portion 2a but adheres to it due to the connection of the flexible and flat portion 2a and the plastic film 3 in said predetermined portion.

Figure 2:
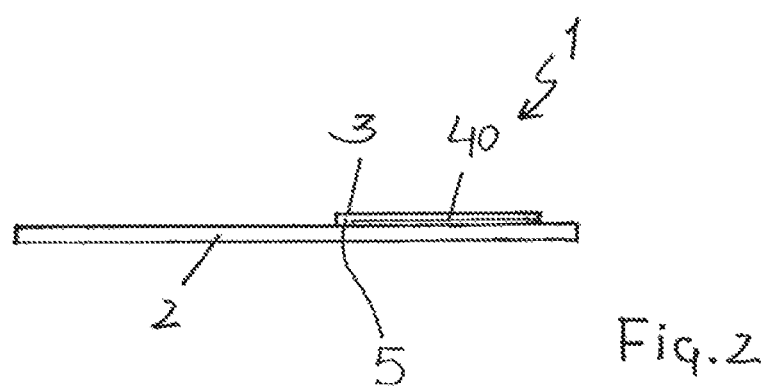
FIG. 2 is a side view of the ear tag according to FIG. 1.

With reference to the cross section of FIG. 2, the pocket 5 of the ear tag of FIG. 1 is schematically shown. FIG. 2 does not represent the pocket 5 in real scale. Indeed, once the plastic film 3 is laminated, it ma adhere to the flexible and at portion 2a and be coplanar with the flexible and flat portion 2a.

The pocket formed by the plastic film 3 with the flexible and flat portion 2a is closed and lamination is made after the UHF inlay 40 is placed onto the flexible and flat portion 2a, to enclose the UHF inlay 40 in the pocket 5, to protect it from mechanical stress and potential fraud. Advantageously, the UHF inlay 40 (and corresponding microchip) is movable inside the pocket 5 independently from the plastic substrate 2, from the flexible and flat portion 2a, and from the plastic film 3. Nothing prevents that the flexible and flat portion 2a and the plastic film 3 are laminated not to fully adhere in inner area of the plastic film 3, in order to delimit a pocket 5 with more space.

At rest, the space delimited by the flexible and flat portion 2a and the plastic film, which is the pocket 5, is flat. When the plastic substrate 2 and/or the flexible and flat portion 2a are bent at a certain degree, also the shape of the space (the shape of the pocket) changes at the same degree. However, the shape of the UHF inlay 40 or its antenna inside the pocket 5 may be subject to less bending, since there is not mechanical connection between the surface of the UHF inlay 40 and the surfaces of the plastic film 3 and of the flat and flexible portion 2a.

Therefore, the UHF antenna 4 is subject to reduced mechanical stress. Indeed, when the plastic support is bent, the UHF antenna 4 and the microchip are free to move inside the pocket (the space inside it), and not forced to follow the bending of the plastic support, or at least not fixedly forced to follow the same bending of the plastic support.

Moreover, the pocket is to indeed, if the plastic film is cut, for instance to extract the antenna, it is not possible to re-laminate it, or at least not possible to re-establish the original structure of the ear tag without leaving signs of counterfeiting.

FIG. 3 schematically represents the ear tag (means 6 are omitted) with separate parts, i.e. the plastic substrate 2, the plastic film 3 and the antenna 4. To assembly the parts, first the UHF inlay 40, including the substrate, the antenna 4 and the microchip not represented), is placed on the flat and flexible portion 2a, then the plastic film 3 is placed on the UHF inlay 4, to completely cover it, and at last a lamination tool laminate the predetermined portions of the plastic film 3 on the flat and flexible portion 2a, thus delimiting the pocket 5.

Preferably, the plastic film 3 is wider than the substrate 41 on which the UHF antenna 4 is arranged. However, nothing prevents that the size of the plastic film 3 and the substrate 41 is substantially the same.

In FIG. 3, the plastic substrate 2a is the plastic substrate of a female component. However, nothing prevents that the plastic substrate of a male component, as schematically represented in FIG. 3a, is used as a flat and flexible portion 2a on which laminating the plastic film 3.

In the above description, the term pocket is used to indicate one single space defined by laminating the plastic film 3 onto the plastic support 2 (for instance on the flat and flexible portion 2a) along a closed path.

However, according to different embodiments of the present invention, a plurality of spaces may be delimited by laminating the plastic film 3 onto the plastic support 2 (for instance on the flat and flexible portion 2a), for instance by laminating the plastic film onto the plastic support 2 along more than one closed path, corresponding to the predetermined portions of lamination.

In this respect, in the ear tag 1 of FIG. 4, the predetermined portions of laminations includes the peripheral edges 3a, 3c of the plastic film 3 and also a line 3b crossing the plastic film 3 from edge 3a to edge 3a, defining two separate and closed pockets 5a and 5b. The lamination line 3b is overlapped to at least a portion 4b of the UHF antenna 4, in this embodiment, other portions of the UHF antenna 4 (and other corresponding portions of the UHF inlay on which the antenna 4 is arranged) different from the portion 4b are free inside the pockets 5a and 5b and the portion 4b is fixed between the plastic film 3 and the plastic substrate 2 (flat and flexible portion 2a).

Preferably, the line 3b extending inside the plastic film 3 from edge 3a to edge 3a is chosen to reduce the surface of the antenna 4 on which the line 3b is overlapped to the antenna 4. For instance, the line 3b is rectilinear and crosses the antenna 4 along a curved surface 3k of the antenna 4 (portion 4b of the sinusoidal antenna 4) in which the overlapping of the line 3b on the antenna is reduced, in other words, in case of rectilinear lamination line 3b, the position of the line 3b selected to avoid crossing a rectilinear surface 3j of the antenna 4 in which the overlapping would be greater (as depicted by dashed lines 3b').

The position of the line 3b may be different. For instance, the line 3b may start from one of the long edges 3a and terminate on one of the short edges 3c; the line may start from one of the long edges 3a or short edges 3c and terminate on the same long or short edge; moreover, the 3b may be curved or partially curved. The shape and position may be selected on the base of the shape of the UHF antenna 4, to reduce overlapping.

In another embodiment of the present invention, schematically represented in FIG. 5, the predetermined portion includes at least one portion 3e, 3d extending inside the peripheral edges 3a, 3c of the plastic film 3. The extending portion 3e, 3d may originate from a peripheral edge, for instance the edge 3a, towards another edge 3a, for instance towards a counter posed edge of a rectangular pocket 5, without touching or overlapping the UHF antenna 4. Also according to this embodiment, the ear tag includes only one pocket, wherein the pocket has a reinforcement along the extending portion 3e, 3d, which strengthen the connection of the plastic film to the flat and flexible portion 2a. The extending portion 3e, 3d may protrude within a curvature 4c of the antenna 4, until a point 3m, surrounded by the antenna 4 and not touching it.

In still another embodiment, at least one portion 3g, 3f inside the peripheral edges 3a, 3c of the plastic film 3 includes points 3f or circles 3f of lamination and/or lines 3g of lamination, wherein the lines 3g of lamination are curved or straight, and wherein the circles 3f, points 3f or lines 3g do not cross over or overlap the UHF inlay 40 and/or the UHF antenna 4 and do not touch the peripheral edges 3a, 3c. With reference to FIG. 6, a U shaped lamination line 3g is laminated within a curved portion 4e of the antenna 4, a straight line 3g is laminated between two adjacent rectilinear portions 4f, 4f of the antenna 4, another lamination line 3g is parallel to the edge 3a and circle, points and transverse lines are further laminated to improve the connection between the plastic film 3 and the flat and flexible portion 2a.

In still another embodiment, schematically represented in FIG. 7, the predetermined portions include a plurality of lines 3h, 3i, 3l around the UHF inlay 4, wherein the plurality of lines are connected to form angles, including acute angles and obtuse angles. The predetermined portions may include a plurality of lines around the UHF inlay, preferably following an external shape of the UHF antenna 4, for example in the form or a sinusoidal lamination line (not represented).

Preferably, at least one of the plastic substrate 2 and the plastic film 3 are in TPU to enhance adhesion when lamination. The plastic substrate and the plastic film both made in TPU material guarantees a high adhesion in the predetermined portion of lamination and therefore are preferred.

The plastic substrate is thicker than the plastic film and the thickness of the plastic film is preferably less than 300 micro meters, more preferably less than 150 micro meters.

The invention claimed is:
1. Ear tag for livestock comprising:
a plastic substrate including means to apply the ear tag to an ear of an animal;

an UHF inlay arranged on a flexible flat portion of the plastic substrate, the UHF inlay including a substrate, an antenna on the substrate and a microchip connected to the antenna;

wherein:

the ear tag includes a plastic film;

a predetermined portion of the plastic film is thermo-compressed on the plastic substrate to form a closed pocket; and the UHF inlay is enclosed in the pocket with a lower surface in contact with the plastic substrate and an upper surface in contact with the plastic film, and is at least in part movable independently from the plastic substrate and the plastic film in the pocket.

2. Ear tag according to claim 1, wherein said predetermined portion includes peripheral edges of the plastic film.

3. Ear tag according to claim 2, wherein said peripheral edges includes two parallel edges, along a length of the UHF inlay, and two parallel edges, along a width of the UHF inlay, said two edges along the length being perpendicular to said two edges along the width.

4. Ear tag according to claim 2, wherein said predetermined portion further includes at least one portion extending inside the peripheral edges of the plastic film.

5. Ear tag according to claim 4, wherein said portion inside the peripheral edges forms two separate pockets in said pocket.

6. Ear tag according to claim 5, wherein said portion inside the peripheral edges forming said two separate pockets connects one edge of the said peripheral edges to another edge of said peripheral edges.

7. Ear tag according to claim 4, wherein said portion inside the peripheral edges cross over at least a portion of said UHF antenna.

8. Ear tag according to claim 4, wherein said at least one portion inside the peripheral edges of the plastic film starts from an edge of said peripheral edges and ends at an inner part of the plastic film, wherein said at least one portion does not cross over or overlap the UHF antenna.

9. Ear tag according to claim 4, wherein said at least one portion inside the peripheral edges of the plastic film includes points or circles of thermo-compression and/or lines of thermo-compression, wherein said lines of thermo-compression are curved or straight, and wherein said circles, points or lines do not cross over or overlap the UHF antenna and do not touch the peripheral edges.

10. Ear tag according to claim 1, wherein said predetermined portions includes a plurality of lines around the UHF inlay, wherein the plurality of lines are connected to form angles, including acute angles and obtuse angles.

11. Ear tag according to claim 1, wherein said predetermined portions includes a plurality of lines around the UHF antenna, wherein the plurality of lines follow an external shape of the UHF antenna.

12. Ear tag according to claim 1, wherein the plastic substrate and the plastic film are in TPU material.

13. Ear tag according to claim 1, wherein the plastic substrate is thicker than the plastic film and the thickness of the plastic film is less than 150 micro meters.

14. Method to form an ear tag for livestock comprising:

providing a plastic substrate including means to apply the ear tag to an ear of an animal;

applying an UHF inlay on a flexible flat portion of the plastic substrate, the UHF inlay including a substrate, an antenna on the substrate and a microchip connected to the antenna;

wherein:

thermo-compressing a plastic film on the flexible flat portion of the plastic substrate, wherein the plastic film is thermo-compressed at a predetermined portion to form a closed pocket enclosing the UHF inlay between the plastic film and the plastic substrate, with a lower surface in contact with the plastic substrate and an upper surface in contact with the plastic film.

15. Method according to claim 14, wherein the plastic substrate and the plastic film are in TPU material.

* * * * *